Nov. 2, 1948.  A. C. PATCH  2,452,787
LANDING GEAR SYSTEM
Filed Jan. 2, 1948  2 Sheets-Sheet 1

INVENTOR.
ARTHUR C. PATCH
BY William P. Lane
ATTORNEY

Nov. 2, 1948.  A. C. PATCH  2,452,787
LANDING GEAR SYSTEM
Filed Jan. 2, 1948  2 Sheets-Sheet 2

INVENTOR.
ARTHUR C. PATCH
BY William C. Lane
ATTORNEY

Patented Nov. 2, 1948

2,452,787

UNITED STATES PATENT OFFICE 2,452,787

LANDING GEAR SYSTEM

Arthur C. Patch, Van Nuys, Calif., assignor to North American Aviation, Inc.

Application January 2, 1948, Serial No. 285

14 Claims. (Cl. 244—102)

This invention relates to an actuating mechanism and an arrangement for controlling operation of the same.

The invention more particularly pertains to a hydraulic actuating mechanism and an electrical arrangement for controlling its operation.

It has been found desirable in connection with retractable landing gear for aircraft to provide an arrangement of fairing doors which are in the closed position with the landing gear either fully retracted or fully extended. This, of course, requires a complete cycle of operation of the doors from closed, to open, to closed position upon each movement of the landing gear from and to retracted position.

In the past, and particularly as set forth in patent application Serial No. 435,253, for Landing gear fairing, filed March 19, 1942 in the name of Eric L. Martin, the landing gear and the fairing doors have been interconnected by a linkage or the like for causing the desired operation of the fairing doors upon movement of the landing gear either from or to retracted position. This arrangement has been found to involve a somewhat complicated mechanism which is not only costly to construct but which adds weight to the airplane and requires maintenance and servicing.

It is therefore an object of this invention to provide an electrically controlled arrangement for operating the fairing doors and landing gear of the aircraft in proper sequence.

It is a further object of this invention to provide a landing gear operating mechanism which is simple to construct, light in weight, and reliable in operation.

Figure 1:
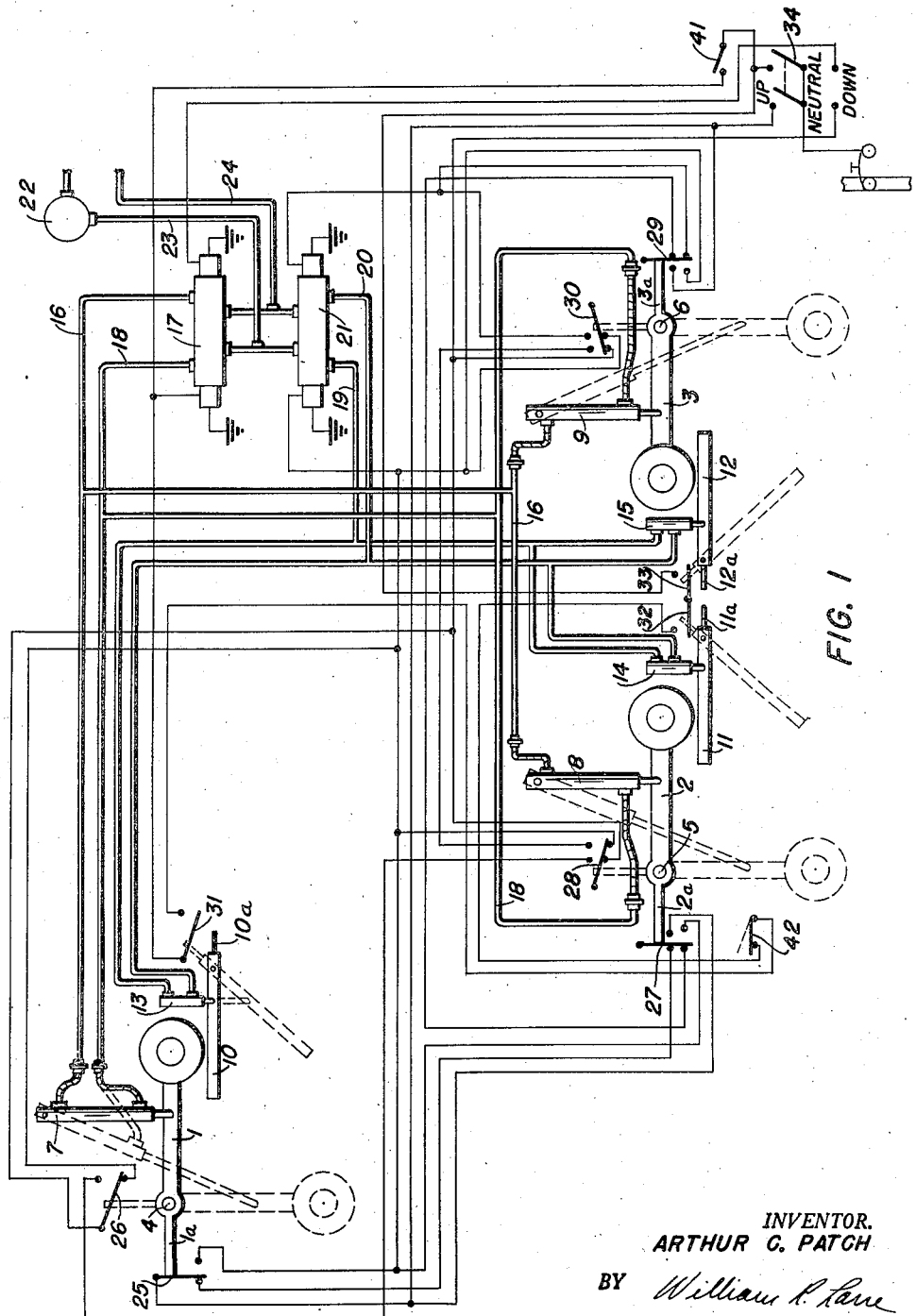
Figure 2:
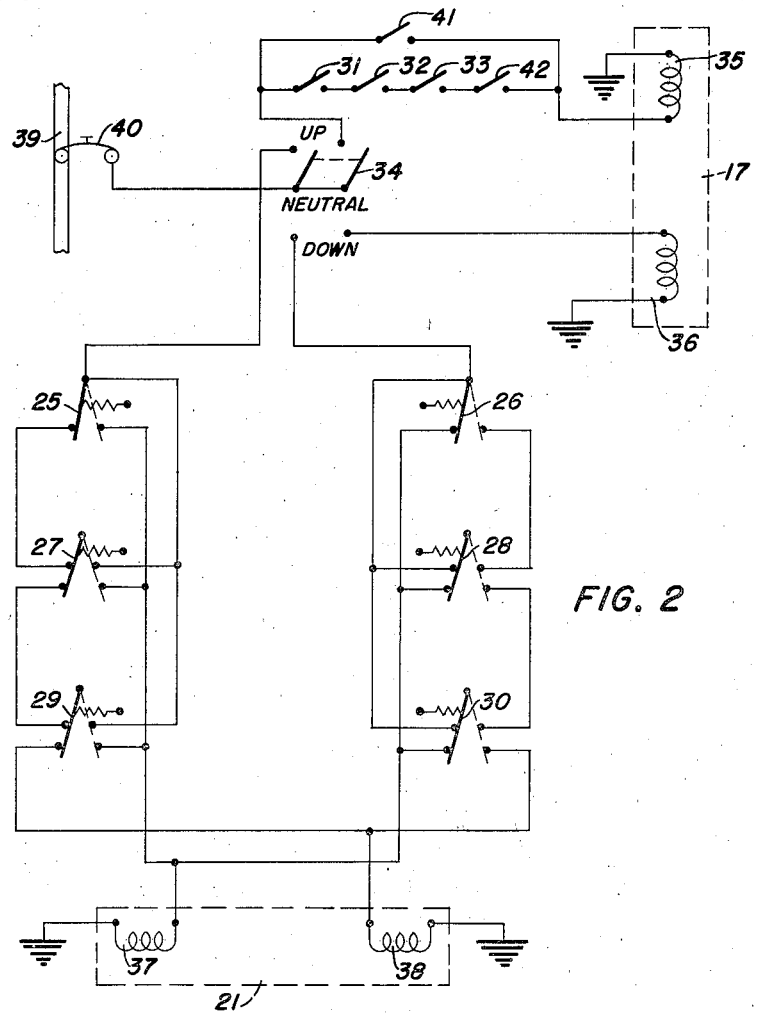
Figure 3:
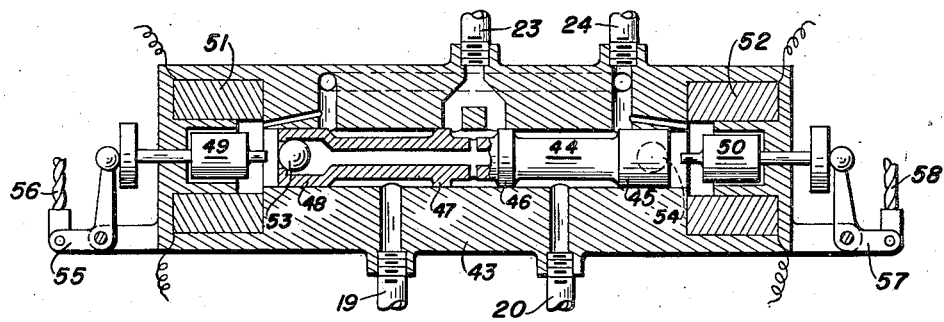

Further objects of invention will become apparent from the following description taken in connection with the accompanying drawings, in which Fig. 1 is a diagrammatic representation of a landing gear system utilizing the invention;

Fig. 2 is a wiring diagram of the electrical control system forming a part of Fig. 1; and Fig. 3 is an arrangement of a conventional valve used in connection with the invention.

Referring now to the drawings, nose gear 1, left main landing gear 2, and right main landing gear 3 constitute a landing gear system for a conventional airplane. These gear are pivoted at 4, 5, and 6, respectively, to move from a retracted position, as shown in full lines, to an extended position, as shown in dotted lines, and thence to retracted position.

The landing gear is operated by a hydraulic system and for purposes of actuation there is attached to the nose and left and right main gear, respectively, hydraulically operated cylinders 7, 8, and 9.

Operatively associated with the nose gear and left and right main landing gear, respectively, are fairing doors 10, 11, and 12. These are suitably pivotally attached to the aircraft and adapted to be actuated by hydraulic cylinders 13, 14, and 15, respectively. The gear-operating cylinders are connected by suitable tubing 16, or the like, to one side of a solenoid valve 17 adapted to operate the landing gear arrangement in one direction. Attached to the other end of this valve is a system of tubing 18, or the like, adapted to connect to the other ends of the gear-operating cylinders for operating the same in the opposite direction.

The door-operating cylinders are likewise operatively connected by means of tubing 19 and 20 to a door-operating solenoid valve 21.

Valves 17 and 21 are commercially available valves of a type comprising suitable ports connected to the fluid lines and a pilot valve actuated by means of a solenoid to cause either of the lines attached thereto to become a pressure line or a return line, as desired, thereby to cause the gear and door-operating cylinder connected therewith to operate in either direction.

Such a valve is illustrated generally in Fig. 3, and comprises a casing 43, a pilot valve 44 having suitable portions 45, 46, 47, and 48 thereon for directing the flow of fluid with respect to conduits 19, 20, 23, and 24. The pilot valve is caused to actuate in one or the other direction by plungers 49 and 50 in response to energization of solenoids 51 and 52 respectively. In this connection, ball valve arrangements 53 and 54 are adapted to be actuated by plungers 49 and 50 respectively to result in operation of the pilot valve to the right or left, as desired. These balls 53 and 54 sealing engage the pilot valve only when in the illustrated position of ball 53. When moved from that position in response to actuation by a solenoid plunger, pressure builds up on the outside of the pilot valve because of the restriction in the return orifice to cause movement of the pilot valve to the right in a manner well known in the art. Actuation of the pilot valve to the left is accomplished in a similar manner by utilization of plunger 50 to unseat ball 54. Valve 17 is constructed similarly to valve 21 and will not be described.

Operatively associated with plunger 49 is a bellcrank 55 adapted to be actuated by pilot controlled cable 56 for use in the event of electrical failure. A similar bell-crank 57 and cable 58 are associated with plunger 50.

For the purpose of maintaining suitable fluid pressure in the line there is provided a hydraulic pressure accumulator 22 connected to the solenoid valves by tube 23. A line 24 is provided to return fluid to its source.

Coming now to the electrical valve-actuating means and controls therefor, there are associated with gear valve 17 a gear-retracting solenoid 35 and a gear-extending solenoid 36. Likewise, there are associated with door valve 21 a door-opening solenoid 37 and a door-closing solenoid 38.

For the purpose of operating these valves in proper sequence there is associated with landing gear members 1, 2, and 3, first switch means comprising switches 26, 28, and 30, respectively, adapted to be held in open position as shown in full lines in Fig. 2 when the gear is retracted to establish a circuit to door-opening solenoid 37, and in so-called closed position as shown in dotted lines in Fig. 2 to establish a circuit, when the gear is extended, to door-closing solenoid 38.

Also associated with landing gear members 1, 2, and 3 is second switch means comprising switches 25, 27, and 29, respectively, adapted to be held in closed position as illustrated in full lines in Fig. 2 when the landing gear is fully retracted to establish a circuit to the door-closing solenoid 38 and movable to open or dotted line position upon movement of said gear to extended position, thus to establish a circuit to door-opening solenoid 37.

The first and second switch means are actuated by projections 1a, 2a, and 3a on the landing gear members.

Associated with the nose and main fairing doors are switches 31, 32, and 33, respectively. These switches are urged into closed position, against the action of the springs associated with them, by projections 10a, 11a, and 12a, respectively, upon movement of the doors to open position, thereby to establish a circuit to gear-retracting solenoid 35. Also in series with switches 31, 32, and 33 is a ground safety switch 42 operatively associated with the main landing gear in a manner well known in the art to prevent retraction of the landing gear when extended and the weight of the airplane applied thereto.

These switches are all suitably connected to a pilot operated landing gear control switch 34 which is of the type having up, down, and neutral or "combat" positions, as shown in the drawings.

A source of electrical energy is provided at 39 and connected into the circuit by a circuit breaker 40. Also provided in the circuit is a switch 41 adapted to override switches 31, 32, 33, and 42 for emergency purposes when it is desired to retract the gear irrespective of the position of the doors, for instance, in the event of power failure during take-off with the doors closed and gear extended, the pilot may desire to collapse the gears for crash landing purposes. Operation of switch 41 permits release of the landing gear for purposes of such retraction, irrespective of the position of the doors.

In the operation of the device with the gear in the retracted position—and it is desired to extend the same for landing purposes—the pilot moves control switch 34 to the "down" position, whereupon a circuit is established—by way of the solid line position of switches 26, 28, and 30 in Fig. 2—to solenoid 37 for opening the fairing doors and, at the same time, to solenoid 36 for moving the gear to extended position. Obviously there is no interference between the doors and gear in this operation since, if anything, the gear will accelerate movement of the doors.

When the respective members of the gear reach the fully extended position, the switches 26, 28, and 30 are urged to closed position, as shown in dotted lines in Fig. 2 by projections 1a, 2a, and 3a respectively, thereby to establish a circuit to door-closing solenoid 38 while, at the same time, maintaining solenoid 36 in a gear extended position. It may be noted that a circuit will not be established to solenoid 38 until all the switches 26, 28, and 30 are in closed position. The doors thereupon remain closed and switch 34 may be moved to the neutral position.

It may be noted that during this operation projections 1a, 2a, and 3a become disengaged from switches 25, 27, and 29 which are permitted to move under the action of their respective springs to open position, as illustrated in dotted lines in Fig. 2. This conditions the circuit for operation of the door-opening solenoid as otherwise herein more fully described.

When it is desired to retract the landing gear after take-off, switch 34 is moved to the "up" position thereby to extablish a circuit to door-opening solenoid 37—by way of the dotted line position of switches 25, 27, and 29 as illustrated in Fig. 2. The doors are thereupon urged to "open" position and when all the doors reach this position switches 31, 32, and 33 are closed, thereby establishing a circuit to gear-retracting solenoid 35, whereupon the gear members are moved to retracted position.

When all the members of the gear are retracted, switches 26, 28, and 30 will have been actuated by their respective springs to their full line positions as shown in Fig. 2, and switches 25, 27, and 29 will be urged to their full line positions in Fig. 2. Thereupon the circuit to the door-opening solenoid valve 37 will be broken and a circuit to the door-closing solenoid valve 38 will be established, whereupon the doors will be moved to "closed" position.

It may be noted that it is impossible to cause improper operation of the gear-actuating mechanism since the circuit for closing the doors is not established until the gear is fully retracted or fully extended and, even though the pilot may desire to retract or extend the gear with the doors being moved to open or closed position, it is only necessary to move switch 34 to "up" or "down" position to thereupon immediately result in energization of the door-opening solenoid valve 37 until the desired gear operation is completed. Thus, in the event any or all of the gears are neither up and locked nor down and locked, any position in which the switch 34 is placed will cause energization of door-opening solenoid 37.

If the pilot should find himself in a position of desiring to retract the gear immediately, without waiting for the doors to open—for instance, for purposes of a crash landing during take-off—it is only necessary to close the emergency or overriding switch 41 to thereby energize "gear up" solenoid valve 35.

When the airplane is airborne and the gears and doors are fully retracted, the switch 34 is preferably moved to neutral or "combat" position, thereby de-energizing the solenoids and relieving pressure in the hydraulic line. This is quite desirable since it will avoid bleeding of the entire hydraulic line in the event a portion thereof is damaged or shot away. The pilot will still have hydraulic fluid in the other hydraulic lines for operating other parts of the airplane.

It is intended that the gear shall be provided with means for positively locking them in the "up" or "down" position. These means may be of any conventional design in a manner well known in the art, and will not be described herein. The fairing doors may also be provided with similar locks, if so desired.

It is desirable of course that the pilot take off with the switch 34 in neutral position to avoid any possibility of the gear being operated during take-off by, for instance, a situation where the airplane bounces and weight is relieved from the landing gear sufficiently to disconnect the ground safety switch 42 and permit operation of the gear-retracting mechanism, which might possibly obtain if the switch 34 is in the "gear up" position during such an occurrence. To avoid this possibility, the arrangement is such that if the pilot should move switch 34 to "gear up" position prior to take-off the fairing doors would open and his attention would be invited by that occurrence to the fact that the switch is in the "gear up" position.

It is desired that the system be wired with an indicating system—well known in the art—whereby the pilot can be advised as to whether the gear members are in the fully extended or fully retracted position. This arrangement is not shown but ordinarily comprises a green light for each member of the gear, which indicates when that member is in either fully extended or fully retracted position, and a red light which indicates when any member is not properly in the fully extended or fully retracted position.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A landing gear for aircraft adapted to be moved from and to a faired retracted position with respect to said aircraft and provided with fairing doors adapted to be closed when said landing gear is either fully extended or retracted, comprising electrically controlled hydraulic means for moving said gear to and from extended position and electrically controlled hydraulic means for moving said fairing doors from and to closed position in response to movement of said gear either to a retracted or a fully extended position.

2. A landing gear for aircraft adapted to be moved from and to a faired retracted position with respect to said aircraft and provided with fairing doors adapted to be closed when said landing gear is either fully extended or fully retracted, means for moving said gear to and from extended position, means for moving said fairing doors from and to closed position upon movement of the gear either from or to retracted position, and electrical means responsive to operation of said landing gear for preventing inadvertent operation of said doors except when said gear is either fully retracted or fully extended.

3. A landing gear for aircraft adapted to be moved from and to a faired retracted position with respect to said aircraft and provided with fairing doors adapted to be closed when said landing gear is either fully extended or fully retracted, comprising means for moving said gear to and from extended position, and means for moving said fairing doors to open position at any position of operation of said gear, and to closed position only upon movement of the gear either to a fully retracted or fully extended position.

4. A landing gear for aircraft adapted to be moved from and to a faired retracted position with respect to said aircraft and provided with fairing doors adapted to be closed when said landing gear is either fully extended or retracted, comprising means for actuating said gear and doors, means for controlling said actuating means, including means responsive to complete retraction or extension of said gear and doors, and pilot operated means operatively connected with said controlling means and said responsive means for preventing retraction of said doors except when said landing gear is either fully extended or fully retracted.

5. A landing gear for aircraft adapted to be moved from and to a faired retracted position with respect to said aircraft and provided with fairing doors adapted to be closed when said landing gear is either fully extended or retracted, comprising solenoid actuated hydraulic valve means for controlling actuation of the said gear and doors, switch means operatively associated with said landing gear and doors and operatively connected with said solenoid valve means to prevent retraction of said doors except when said landing gear is either fully extended or fully retracted.

6. A landing gear for aircraft adapted to be moved from and to a faired retracted position with respect to said aircraft and provided with fairing doors adapted to be closed when said landing gear is either fully extended or retracted, comprising hydraulic means for actuating said gears and doors, valve means for controlling said hydraulic means, pilot controlled electrical means for actuating said valve means, and switch means operatively associated with said landing gear and doors and operatively connected with said pilot controlled means to prevent retraction of said doors except when said landing gear is either fully extended or fully retracted.

7. A landing gear for aircraft adapted to be moved from and to a faired retracted position with respect to said aircraft and provided with fairing doors adapted to be closed when said landing gear is either fully extended or retracted, comprising electrically controlled hydraulic means for moving said gear to and from extended position, electrically controlled hydraulic means for moving said fairing doors from and to closed position, pilot actuated switch means for operating said hydraulic means, and switch means operatively associated with said landing gear and doors and operatively connected with said pilot switch means and said hydraulic means to prevent retraction of said doors except when said landing gear is either fully extended or fully retracted.

8. A device as recited in claim 7 including an emergency overriding switch for said pilot switch electrically connected to said hydraulic means for causing movement of said gear to retracted position irrespective of the position of said doors.

9. A landing gear for aircraft adapted to be moved from and to a faired retracted position with respect to said aircraft and provided with fairing doors adapted to be closed when said landing gear is either fully extended or fully retracted, comprising means for actuating said gear and doors, electrical means for controlling said actuating means, including a pilot operated switch movable from a neutral to a "gear up" or "gear down" position, a pair of switches operatively associated with each of said fairing doors and each retractable member of said landing gear to be closed thereby upon either complete extension or retraction of its corresponding door or member, said pilot switch and said other switches being operatively connected to sequentially open said doors and either retract or extend said gear and thence close said doors only when said gear is either fully extended or fully retracted.

10. A landing gear for aircraft adapted to be moved from and to a faired retracted position with respect to said aircraft and provided with fairing doors adapted to be closed when said landing gear is either fully extended or fully retracted, comprising means for actuating said gear and doors, electrical means for controlling said actuating means, switch means operatively associated with said landing gear to be operated thereby when either fully extended or fully retracted, switch means operatively associated with said doors to be operated thereby when said doors are open, pilot controlled switch means operatively connected to said electrical means and all said switch means to open said doors and move said gear to fully retracted or fully extended position and thence close said doors.

11. A landing gear for aircraft adapted to be moved from and to faired retracted position with respect to said aircraft and provided with fairing doors adapted to be closed when said landing gear is either fully extended or fully retracted, comprising hydraulic means for actuating said gear and doors, solenoid means for controlling said actuating means, switch means operatively associated with said landing gear to be operated thereby when either fully extended or fully retracted, and means operatively associated with said doors to be operated thereby when said doors are open, pilot controlled switch means operatively connected to said solenoid means and all said switch means to open said doors and move said gear to fully retracted or fully extended position and thence close said doors.

12. A landing gear for aircraft adapted to be moved from and to faired retracted position with respect to said aircraft and provided with fairing doors adapted to be closed when said landing gear is either fully retracted or fully extended, comprising a pilot actuated switch movable from a neutral to a "gear down" position, switch means operated by said landing gear to establish a circuit to a door-opening solenoid when the gear is fully retracted and to a door-closing solenoid when the gear is fully extended, and solenoid means for moving said gear to extended position, said pilot actuated switch means when moved to the "gear down" position establishing a circuit through said landing gear switch means to said door-opening solenoid and said gear-actuating solenoid to extend the same and thereby to establish a circuit to said door-closing solenoid.

13. A landing gear for air craft adapted to be moved from and to faired retracted position with respect to said aircraft and provided with fairing doors adapted to be closed when said landing gear is either fully retracted or fully extended, comprising a pilot operated switch movable from neutral to "gear up" position, switch means operated by said landing gear to establish a circuit to a door-opening solenoid when the gear is fully extended and to a door-closing solenoid when the gear is fully retracted, solenoid means for moving said gear to retracted position and switch means actuated by said doors to establish a circuit from said pilot actuated switch to said gear-actuating solenoid when said doors are open and said gear extended, said pilot actuated switch, when moved to the "gear up" position, establishing a circuit through said landing gear switch means to said door-opening solenoid, thence to said gear-actuating solenoid to retract the same and thereby to establish a circuit to said door-closing solenoid.

14. A landing gear for aircraft adapted to be moved from and to faired retracted position with respect to said aircraft and provided with fairing doors adapted to be closed when said landing gear is either fully retracted or fully extended, comprising a pilot actuated switch movable from a neutral to a "gear down" or "gear up" position, solenoid actuated door-opening means, solenoid actuated gear-extending means, and solenoid actuated door-closing means, first switch means operated by said landing gear to establish a circuit to said door-opening solenoid when the gear is fully retracted and to said door-closing solenoid when the gear is fully extended, said pilot actuated switch when in the "gear down" position establishing a circuit through said first switch means to said door-opening solenoid and said gear-actuating solenoid to fully extend the same and thence to said door-closing solenoid to close said door and complete a door-opening, gear-extending, door-closing cycle, second switch means operated by said landing gear to establish a circuit to said door-opening solenoid when said gear is fully extended and to said door-closing solenoid when said gear is fully retracted, solenoid actuated means for moving said gear to retracted position and switch means actuated by said doors to establish a circuit to said gear-retracting solenoid means when said doors are fully extended, said pilot actuated switch when moved to the "gear up" position establishing a circuit through said second switch means to said door-opening solenoid thence to said gear-actuating solenoid to retract the same and establish a circuit to said door-closing solenoid to close said door and complete a door-opening, gear-retracting, door-closing cycle.

ARTHUR C. PATCH.

No references cited.